United States Patent [19]

Schumacher

[11] 4,135,499

[45] Jan. 23, 1979

[54] SEALING PISTON

[75] Inventor: Frederick A. Schumacher, Wykoff, N.J.

[73] Assignee: Silicon Technology Corporation, Oakland, N.J.

[21] Appl. No.: 861,305

[22] Filed: Dec. 16, 1977

Related U.S. Application Data

[63] Continuation of Ser. No. 734,179, Oct. 20, 1976, abandoned.

[51] Int. Cl.² ............................................. B28D 1/04
[52] U.S. Cl. ..................................... 125/15; 51/73 R
[58] Field of Search ......................... 125/15; 51/73 R; 92/245

[56] References Cited

U.S. PATENT DOCUMENTS

| 2,598,609 | 5/1952 | Samuel | 92/245 X |
| 2,884,292 | 4/1959 | Doner | 92/245 |
| 3,827,421 | 8/1974 | Schumacher | 125/15 |

Primary Examiner—Harold D. Whitehead

Attorney, Agent, or Firm—Philip H. Gottfried

[57] ABSTRACT

In an apparatus for clamping and uniformly tensioning an inside diameter cutting blade, hydraulic fluid is contained within an annular fluid channel which includes an opening confronting the inside diameter blade. The hydraulic fluid is prevented from contacting the blade by a pressure-transmitting deformable sealing piston mounted within the fluid channel. The sealing piston is generally U-shaped in cross section and includes, in addition to a relatively axially thick main body part, at the sides of the "U", two outwardly directed arms when the piston is not in place within the fluid channel which it seals. When the arms of the piston are brought toward one another for insertion of the piston within the fluid channel, the piston material, which is resilient, urges the arms radially outward thereby forming a good seal with the inner and outer walls of the fluid channel. The inner and outer walls of the fluid channel are generally unbroken as are the radially inner and outer surfaces of the piston thereby permitting relative axial movement between the piston and the fluid channel.

5 Claims, 6 Drawing Figures

SEALING PISTON

This is a continuation of application Ser. No. 734,179 filed Oct. 20, 1976 now abandoned.

The present invention relates generally to article tensioning devices, and in particular, to an improved combination sealing and pressure-transmitting member for use in an hydraulically operated article tensioning device.

Recently, there has been an increasing need for slicing extremely thin sections or wafers from large crystals. For example, in the electronics industry extremely thin slices of silicon, on the order of 0.007 inches in axial dimension, have been used, usually cut from larger silicon crystals which can be economically grown, and then sawed into wafers of the required thickness.

Naturally, in view of great expense of the raw silicon material, minimization of waste of the silicon is a prime consideration as is uniformity of size and surface configuration of the wafers which often are as large as 3 inches in diameter. In order to provide the wafers of the required size and surface characteristics, while also minimizing waste, special cutting blades have been devised for slicing silicon wafers from larger ingots.

One of the required characteristics of the cutting blades is that they must be thin enought to produce the required thin wafer and minimize waste and must also have a rigidity sufficient to slice through a 3 to 5 inch diameter silicon crystal. This combination of thinness and rigidity is generally not attainable with the usual cutting blade where the cutting surface is on the outside circumference thereof.

As noted in U.S. Pat. No. 3,827,421 of Aug. 6, 1974, assigned to the assignee of the subject application and as noted in U.S. Pat. application Ser. No. 605,856, filed Aug. 19, 1975, which has also been assigned to the assignee of the present application and the teachings of which are incorporated herein by reference, a cutting blade which provides the required thinness and rigidity, coupled with the required cutting depth capability is a thin, circular saw blade clamped about its outside diameter including an opening centrally thereof forming an inside diameter blade, hereinafter sometimes referred to as an "ID" blade.

Typically, an ID blade is utilized in a slicing machine wherein the blade is clamped in a housing about its circumference with the surface of the blade being uniformly tensioned to provide the cutting surface of the inside diameter opening with the required rigidity to produce uniform results.

Since it is well known that fluid transmits pressure applied thereto equally in all directions, an hydraulic fluid channel including a means of ingress and egress of hydraulic fluid therefrom was formed in a clamping ring with an opening of the channel confronting a clamped saw blade. A recess channel was radially aligned with the fluid channel on one side of the ID blade clamping and tensioning apparatus, and hydraulic fluid was made to impinge upon the clamped blade thereby uniformly deforming the blade and resulting in a uniformly tensioned and clamped blade.

While the apparatus described was satisfactory in some respects and superior to mechanically clamping and tensioning the ID blade, there was often the problem of leakage of the hydraulic fluid with consequent loss of tensioning pressure, and consequent disruption of the slicing process. When the ID blade broke, virtually all of the fluid would leak out of the tensioning fluid channel.

In order to solve some of the disadvantages of the hydraulic tensioning apparatus described hereinbefore, a gasket was devised for retaining the hydraulic fluid within the fluid channel, thereby preventing the direct contact of the fluid with the saw blade. The gasket was retained within the blade clamping apparatus by radially inner and outer projecting ears which mated with similarily configured radially inner and outer recess channels within the clamping and tensioning apparatus. Such a gasket is shown in the 382,421 patent identified hereinbefore.

The gasket shown in the 382,421 patent was relatively thin in cross section at is main body part; and, consequently, the fluid channel thereof required a great deal of tensioning fluid therein which fluid is relatively expensive and which therefore increased the cost of operation of the blade tensioning and clamping apparatus, if the fluid was lost during operation of the machine. This loss of fluid occurred whenever the gasket ruptured, which was not infrequently due to the thin axial dimension of its main body part. In addition, fluid loss occurred due to the difficulty of properly inserting the "ears" in the channels.

In addition, at least partially in view of the thin axial dimension of the main body part of the gasket of the 382,421 patent, if the gasket developed a permanent deformation or "set" as a result of tension applied to the gasket over a long period of time, when the blade required replacing either because it began to dull or because the blade broke, the "set" of the gasket rendered it very diffucult if not impossible to use the same gasket with a new blade thereby often requiring replacement of the gasket each time a blade had to be replaced.

This requirement for replacement of a gasket each time a blade was replaced not only increased the expense of operating the cutting machine but also increased the inactive or "down" time of the machine thereby resulting in costly production delays.

Solving some of the problems inherent in the single piece gasket shown in the 382,421 patent, is a two-piece gasket such as shown and described in the 605,856 application. The two-piece gasket was comprised of an outer sleeve of a given durometer which was secured within the annular fluid channel by radially inner and outer projecting ears located within like-configured radially inner and outer annular recesses in a clamping apparatus. The outer sleeve was generally U-shaped in cross section and was constructed and arranged with the open end of the "U" confronting the saw blade and with the bottom of the "U" sealing the fluid channel. A plug of different durometer was located within the outer sleeve, was deformed by pressure on the outer sleeve caused by the pressure on the fluid and was the part of the gasket which actually impinged upon and deformed the saw blade. the inner plug was reversible once it attained a permanent deformation or "set"; and, its presence within the annular fluid channel reduced the amount of tensioning fluid required for proper operation of the apparatus.

Despite the advantages of the one and two-piece gaskets described hereinbefore and the problems which they solved, they each had disadvantages, difficulties and problems.

For example, both gaskets noted hereinbefore required that special radially inner and outer receiving recesses be machined within the fluid channel to receive the radially inner and outer ears necessary for maintaining the single piece or the outer sleeve of the two-piece gasket in position within the fluid channel.

In addition, in installing the single piece gasket or the outer sleeve of the two-piece gasket, it was often very difficult and time consuming to position the radially inner and outer annular ears of the gasket with the corresponding radially inner and outer receiving recesses.

Further, when either the single-piece or the two-piece gasket developed a permanent deformation or "set", despite the fact that at least in the two-piece gasket the inner filler ring could be reversed for re-use, removing the inner filler ring and reversing the same was time consuming; and, it was necessary to reverse the inner filler ring (in the two-piece piston) or to replace the entire gasket (in the single-piece gasket) before a new saw blade could be properly positioned for clamping and subsequent tensioning.

In addition, in view of the space occupied by the projecting ears of the seals described hereinbefore, the radially extending working surface for a seal of given radial extent was somewhat limited.

Finally, while the gaskets of the prior art sealed well at relatively high hydraulic pressures, before the hydraulic pressure increased, there was a tendency for some of the hydraulic fluid to move around the seal; and, the same tendency at greatly increased hydraulic pressures when the seal effectiveness would tend to break down.

It is an object of the present invention to provide an improved fluid pressure sealing apparatus and pressure transmittal member which facilitates uniform hydraulic tensioning of an ID saw blade.

It is a more particular object of the present invention to provide a single-piece sealing member which effectively seals fluid within an hydraulic channel over the full range of operating pressures.

It is a still more particular object of the present invention to provide a single-piece, slidable hydraulic seal and pressure-transmitting device for use in a blade mounting and tensioning apparatus wherein the sealing and pressure-transmitting member is slidable between a first, blade insertion-removal position and a second, axially extended blade tensioning position.

It is a further object of the present invention to provide an improvement in a blade mounting and tensioning apparatus wherein a slidable fluid sealing piston is provided which functions as an effective sealing member over an entire range of operating pressures and which is economical to produce, install and operate.

In accordance with a specific embodiment of the present invention, an improvement in a blade mounting and tensioning apparatus is provided wherein the apparatus includes first and second annular clamping members. Means are provided for clamping the periphery of the blade between the clamping members. An annular fluid channel exists within the first clamping member and is located radially inward of the clamping means and has an opening confronting one side of the blade. An annular recess channel is located within the second clamping member radially aligned with the annular fluid channel and has an opening confronting the other side of the blade. A deformable sealing piston is located within the annular fluid channel opening and fluid is, in turn, located within the annular fluid channel. The sealing piston is constructed and arranged to seal the fluid within the annular fluid channel against contact with the blade and is further constructed and arranged to bear against a clamped blade upon pressure being exerted on the fluid whereby the pressure uniformly deforms the sealing piston against the blade therebyuniformly deforming the blade into the recess channel and uniformly tensioning the blade. The improvement comprises the sealing piston being generally U-shaped in cross section, having a main body part and two outwardly directed arms. The main body part is axially relatively thick being of a thickness which is on the order of one-third of the radial extent of the main body part of the sealing piston. The sealing piston and the fluid channel are constructed and arranged for the sealing piston to be capable of axial movement within the fluid channel in response to pressurization of the fluid.

The above brief description, as well as further objects, features and advantages of the present invention will be more fully understood by reference to the following detailed description of a presently preferred but nonetheless illustrative embodiment in accordance with the present invention, when taken in conjunction with the accompanying drawing, wherein.

Figure 3:
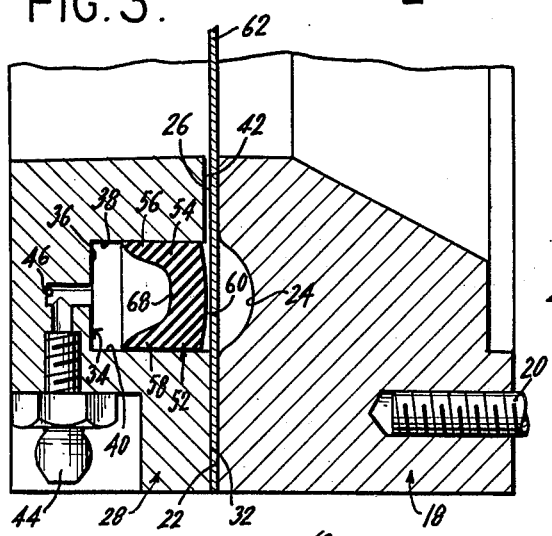
FIG. 3 is an enlarged fragmentary sectional view of the saw blade housing of FIG. 1 showing an annular fluid channel thereof, without fluid, and the sealing piston of the present invention in place therein with a saw blade clamped but not tensioned.
Figure 5:
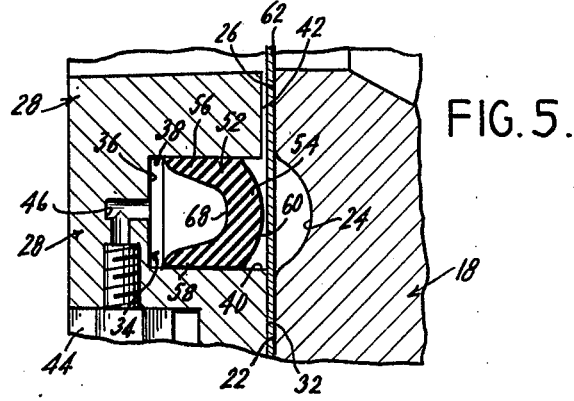
Figure 6:
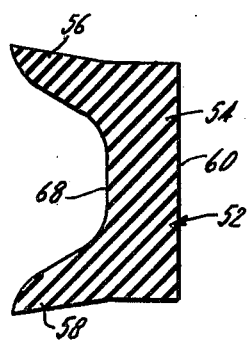

FIG. 5 is an enlarged partial sectional view of the saw blade housing, similar to FIG. 3, with the fluid removed from the annular fluid channel, with the saw blade clamped but untensioned and the previously tensioned sealing piston carrying a "set" and having been moved within the annular fluid channel; and, FIG. 6 is an even further enlarged cross section of the sealing piston of the present invention prior to insertion within the annular fluid channel and prior to deformation thereof.

Figure 1:
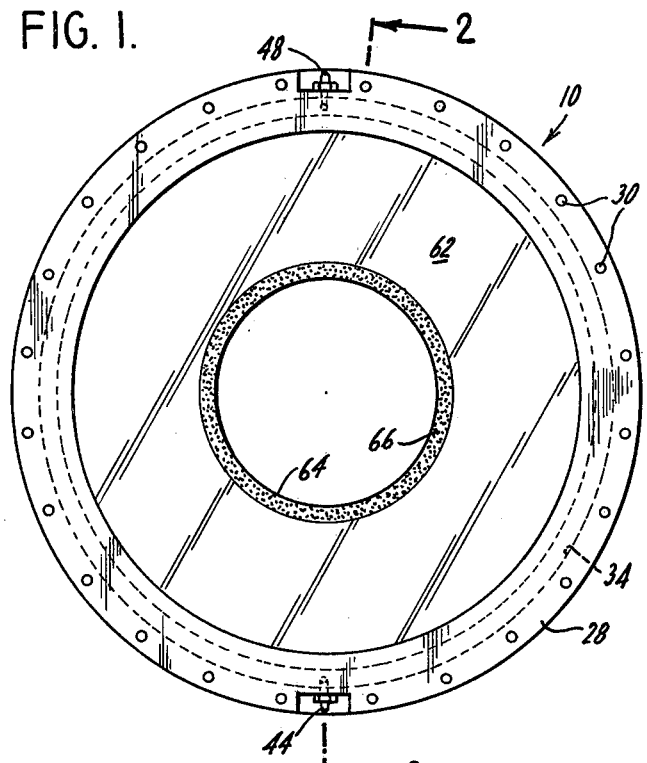
FIG. 1 is a front view of a saw blade and saw blade housing embodying the present invention.
Figure 2:
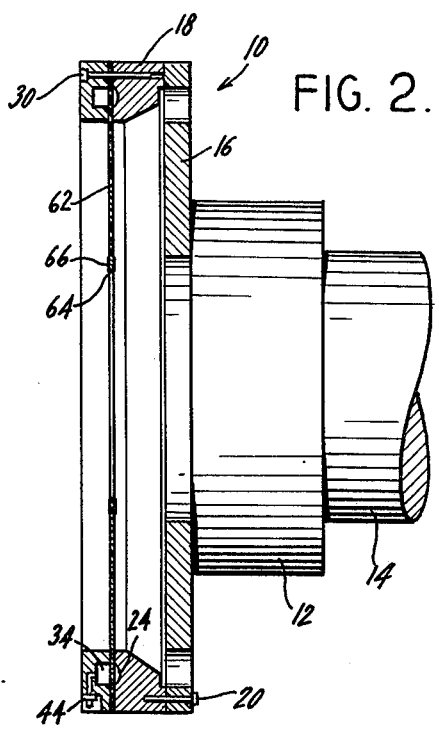
FIG. 2 is a sectional view taken along the line 2—2 of FIG. 1 and looking in the direction of the arrows.

Referring now specifically to the drawing and first to FIGS. 1 and 2, in accordance with an illustrative embodiment demonstrating objects and features of the present invention, there is provided a saw blade housing, generally designated by the reference numeral 10, which is attached, by a hub 12 to the drive shaft 14 of a crystal ingot slicing machine (not shown).

Naturally, while the blade tensioning device of the present invention is described as being usable in the preferred embodiment with an ID cutting blade for slicing thin sections of silicon, such a use is merely an illustrative embodiment of the present invention and other applications thereof are possible and are considered to be within the contemplation and scope thereof.

In the preferred embodiment, a spindle plate 16 is shown attached to the hub 12 by any conventional means (not shown). A generally cylindrical, annular tensioning ring 18 is attached to the spindle plate 16 by a plurality of tensioning ring bolts 20 which are equally spaced about the spindle plate 16. The tensioning ring bolts 20 pass through smooth-bored openings within the spindle plate 16 and engage a series of threaded openings within the tensioning ring 18 thereby providing for secure attachment of the tensioning ring to the spindle plate.

The tensioning ring 18 includes a radially outer blade clamping surface 22 (FIG. 3), to be more fully described hereinafter, which extends axially a predetermined distance from the axially outer leftmost surface of the spindle plate 16. An annular tensioning ring recess 24, which is generally partially circular in cross section, is located within the tensioning ring 18 radially inward of the clamping surface 22 for a purpose to be described hereinafter.

A tensioning ring abutment surface 26 appears within the tensioning ring 18 radially inward of the tensioning ring recess 24 and is located approximately the same axial distance from the axially outermost surface of the spindle plate 16 as is the tensioning ring recess.

An annular clamping ring 28, of substantially, the same diameter as the tensioning ring 18, is removably fixed thereto by means of a plurality of clamping ring bolts 30. The claming ring bolts 30 are located within a plurality of smooth-bored openings equally spaced within the circumference of the clamping ring 28 and which are seated within correspondingly threaded openings within the tensioning ring 18. The clamping ring 28 includes, on its radially outermost axial surface, a clamping ring clamping surface 32, to be described more fully hereinafter.

Located radially inward of the clamping ring clamping surface 32, within the clamping ring 28, is an annular fluid channel 34 which is generally U-shaped in cross section with the open part of the "U" confronting the tensioning ring 18. The annular fluid channel 34 includes an unbroken lower surface 26 which is plane in cross section and radially inner and outer unbroken surfaces 38, 40 which are also plane in cross section.

Located radially inwardly of the annular fluid channel 34 is a clamping ring clearance surface 42 which is at a greater axial distance from the axially outermost surface of the spindle plate 16 than is the surface of the clamping ring clamping surface 32, for a purpose to be described hereinafter.

Access to the interior of the annular fluid channel 34 is through an hydraulic fluid inlet check valve 44 which is of conventional design. The inlet valve 44 is threaded into an opening within the clamping ring 28 and is recessed therein. The inlet valve 44 permits fluid to enter the annular fluid channel 34 through a conduit 46 which communicates therewith and does not permit the passage of fluid out of the channel 34.

Spaced 180 degrees about the clamping ring 28 is an hydraulic fluid outlet valve 48 of conventional design which is likewise threaded within an opening in the clamping ring 28. The outlet valve 48 communicates with the interior of the annular fluid channel 34 through a conduit and is used to ensure that there is no trapped air within the annular fluid channel when hydraulic tensioning fluid 50 is placed therein, in a manner to be described hereinafter.

An annular, single-piece, fluid sealing piston 52 is located within the annular fluid channel 34 and is generally U-shaped in cross section. The sealing piston 52 which functions to some degree as a gasket, and is shown in FIG. 6 in cross section. The piston 52 may be formed of any deformable resilient material capable of withstanding the operating pressures of the subject apparatus in the range of 1000 to 3000 psi, such as polyurethane or the like.

As may be seen by reference to FIG. 6, the piston 52, in cross section, includes a relatively thick and generally rectangular main body part 54 which has two outwardly directed, generally triangular, radially inner and outer arms 56, 58 attached to the main body part 54.

The piston 52 includes an axially innermost blade contact surface 60 which is plane in cross section when the piston 52 has not been subjected to stress (either current or residual) and has not been deformed. As will be discussed in detail hereinafter, when the piston 52 is placed within the fluid channel 34, the blade contact surface 60 assumes a curvilinear shape in cross section before it is subjected to the stress of the hydraulic fluid 50 (see FIG. 3); assumes a more curved shape in cross section when it is deformed under the action of pressurized hydraulic fluid 50 (see FIG. 4); and tends to retain that greater curvilinear shape (i.e., retains a "set") after the pressure on the hydraulic fluid 50 has been removed (see FIG. 5).

An annular saw blade 62 is positioned with locating pin holes therein (not shown) over locating pins (also not shown) which project axially outward from the tensioning ring 18. The clamping ring 28 includes openings therein (not shown) which correspond to the locating pins and which openings are aligned with the locating pins. Each of the plurality of clamping ring bolts 30 are then inserted, tightened and torqued to the same value.

As may be seen by reference to FIGS. 1 and 2, the annular saw blade 62 includes an inside diameter opening 64 which is ringed by diamond bort 66 fixed to the blade to increase the life of the cutting edge thereof, in a conventional manner.

As noted hereinabove, and as may be seen by reference to FIGS. 3, 4 and 5, the axial distance of the clamping ring clamping surface 32 and that of the clamping ring clearance surface 42 from the axially outermost surface of the spindle plate 16 differ. The clearance surface 42 is spaced further from the axially outermost surface of the spindle plate than is the clamping surface 32. Also as may be noted by reference to FIGS. 3, 4 annd 5, the tensioning ring clamping surface 22 and the tensioning ring abutment surface 26 are substantially the same axial distance from the axially outermost face of the spindle plate 16. The reason for these axial spacings of the surfaces 22, 26, 32, 42 shall become apparent during the discussion of the operation of the subject apparatus discussed hereinafter.

In order to protect the tensioning ring clamping and abutment surfaces 22, 26 from wear, they may be plated with a tough, corrosion-resistant material such as nickel or the like. However, since they are the same axial distance from the axially outermost surface of the spindle plate 16, they most both be plated with approximately the same amount of material. On the other hand, the greater axial protrusion of the clamping ring clamping surface 32 (which is axially closer to the axially outermost surface of the spindle plate 16 than is the clamping ring clearance surface 42) can be obtained by plating only the surface 32 (and not the surface 42) with a corrosion-resistant material such as nickel or the like.

In assembly of the apparatus 10, before placing the clamping ring 28 with the locating pin openings therein in registry with the locating pins protruding axially from the tensioning ring after the ID blade 62 has been placed thereover, the sealing piston 52 is placed within the fluid channel 34 by depressing the radially inner and outer arms 56, 58 inward and sliding the piston 52 along the radially inner and outer polished surfaces 38, 40 of the channel 34. The piston 52 is slid into the fluid channel 34 an axial distance sufficient to place the rightmost, axially innermost, part of the normally plane blade contact surface 60 more axially inward within the annular fluid channel 34 than the clamping ring clamping surface 32 (see FIG. 3). Naturally, by virtue of the arms 56, 58 being moved toward one another, necessary to place the piston 52 within the fluid channel 34, the blade contact surface 60 of the piston assumes a gently convex outward curved configuration and is no longer plane (again, see FIG. 3).

The channel 34 and the piston 52 are constructed and arranged so that their relative axial extent is such that even after deformation of the piston (as in FIG. 4) it may be slid into the channel a sufficient distance to prevent protrusion of the blade contact surface 60 beyond the clamping ring clamping surface 32 (see FIG. 5).

As a result of the piston 52 being formed of a material of sufficient durometer to withstand the operating pressures of 1000 to 2000 psi placed on the hydraulic fluid 50 (in a manner to be described hereinafter), the material of the piston urges the arms 56, 58 outwardly against the polished inner and outer walls 38, 40 of the channel 34 thereby aiding, in conjunction with the shape of the inner, fluid contact surface 68, the piston 52 in sealing the hydraulic fluid 50 within the channel 34.

After the apparatus is assembled with the saw blade 62 clamped in position and the piston 52 located within the channel 34, hydraulic fluid 50 is placed into the fluid channel 34 through the inlet value 44, entering through the fluid inlet conduit 46. The hydraulic tensioning fluid bleed valve 48 is opened to permit the escape of any air trapped in the channel 34. When, after a period of time only hydraulic tensioning fluid 50 and no air exits from the bleed valve 48, located in the upright position as shown in FIG. 1, the bleed valve 48 is closed.

Sufficient hydraulic fluid 50 is placed under pressure of from 1000 to 3000 psi and according to well-known laws of physics, the hydraulic fluid exerts that pressure equally in all directions on the chamber 34, the conduit 46 and the fluid contact surface 68 of the piston 52.

In view of the piston 52 being the only deformable part of the sealed compartment comprised of the channel 34 and the piston 52, and in view of the piston being deformable and slidable, the piston slides and deforms under the pressure of the hydraulic fluid, sliding axially inward to the right as shown in the drawing (compare FIG. 3 with FIG. 4) until at least part of the piston including the blade contact surface 60 slides axially outward to the right beyond the axially inner limit of the clamping ring 28.

As may be noted by reference to FIG. 3, when the saw blade 62 is clamped but not tensioned, the radially outer part of the saw blade is held between clamping and tensioning ring clamping surfaces 32, 22 and the axially inner or rightmost surface of the blade 62 abuts the tensioning ring abutting surface 26. By virtue of the axial position of the clamping ring clearance surface 42 noted hereinabove, the saw blade 62 does not touch the surface 42; and, radially inward of the clamping surfaces 32, 22, the saw blade is free to move axially.

When pressure is applied to the hydraulic fluid 50, deforming the piston 52 and moving it to the right, the piston deforms and moves to the right until it contacts the saw blade 62 and it deforms the saw blade into the tensioning ring recess 24 thereby radially tensioning the saw blade 62. In virtue of the equal pressure which exists throughout the entire circumference of the fluid channel 34, the saw blade 62 is equally deformed and equally tensioned in all radially outward directions.

In virtue of the specific configuration of the fluid contact surface 68 of the piston 52, and in virtue of the radially outward tension which the radially inward-forced arms 56, 58 exert on the surfaces 38, 40, the piston 52 exerts a proper seal on the surfaces of the fluid channel 34 to maintain the fluid 50 within the channel from commencement of pressurization of the fluid until the desired degree of deflection of the saw blade 62 into the tensioning ring recess 24 and the desired tensioning of the saw blade is attained.

The fact that the piston 52 does not include mounting projections, such as contained in prior art seals, not only permits sliding movement of the piston 52 under pressure (which results in less actual deformation of the sealing piston and which, in turn, tends to prevent bursting of the sealing piston under pressure), but also permits the use of a larger blade contact surface 60 for the same radial size opening in the clamping ring 28 thereby permitting a larger surface 60 to contact the blade 62. Such larger blade contact is necessary with larger diameter blades which must be deflected more than smaller diameter blades to achieve the required tensioning thereof.

In addition to the slidability of the piston 52 within the channel 34 permitting less deformation of the piston to achieve the same blade deflection contributing to increased piston life, the relative thickness of the main body part 64 of the piston 52 (being on the order of approximately one-third in axial extent relative to the radial extent of the seal, in the preferred embodiment), further contributes to the elimination of piston failure.

When, either through failure of the blade 62 or dulling of the cutting edge 64 thereof, it is necessary to change the blade 62, the bleed valve 48 is opened to relieve the pressure on the hydraulic fluid 50, the tensioning ring bolts 30 are loosened and removed and the tensioning ring 28 is removed from the apparatus 10. The fragmented or dulled saw blade 62 is removed from the locating pins and a new blade placed thereon.

In prior art apparatuses it was necessary, in order to correctly position the new saw blade 62 during tightening of the clamping ring 28 once it was replaced on the apparatus 10, to either replace the fluid gasket if it had developed a permanent set and outward bow (making it protrude beyond the clamping ring clamping surface 32), or if it was a two-piece seal having a filler ring, reverse the filler ring within the outer relatively stationary part of the gasket.

Figure 4:
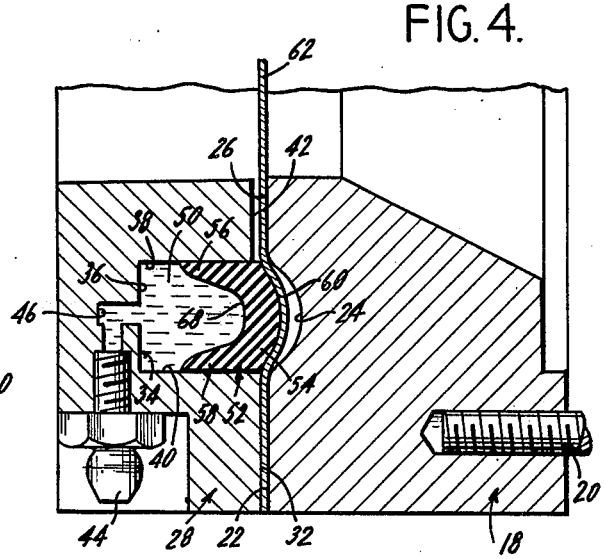
FIG. 4 is an enlarged partial sectional view similar to FIG. 4 with fluid shown in the fluid channel and pressurized with the clamped saw blade tensioned by the sealing piston which has been deformed thereby.

However, with the piston 52 of the present invention, it is only necessary to slide the piston 52 axially outward to the left so that the axially outermost part of the blade contact surface 60 is located axially inward with respect to the clamping ring clamping surface 32 (compare FIG. 4 with FIG. 5). In view of the particular construction and arrangement of the piston 52, the aforementioned sliding can be accomplished relatively easily despite the piston 52 having retained a permanent deformation or "set".

The clamping ring bolts 30 are then re-torqued to the desired value and sufficient pressure is placed on the hydraulic tensioning fluid 50 in the manner discussed hereinbefore to uniformly deform the sliding piston 52 against the new saw blade 62 and tension the new saw blade the desired amount.

In view of the construction and arrangement of the piston 52 just described, as may be noted, longer life is provided a fluid retaining and pressure transmitting member, changing of blades is greatly simplified thereby and consequently occurs much more rapidly.

In addition, when it is necessary to finally replace a sealing piston 52, in view of it either acquiring a permanent "set" which is unacceptable or, as a result of fatigue from repeated cycling, when the piston bursts, replacement of the piston is greatly simplified as well.

All that is required to replace the piston 52 is to remove the old piston by merely sliding it out of the polished surfaces 38, 40. The arms 56, 58 of a new piston are urged toward one another and the piston is slid with the compressed arms traveling along the polished surfaces 38, 40 until the blade contact surface 60 of the piston is moved axially outward to the left a distance sufficient to place the now-crowned surface 60 radially outward and to the left with respect to the clamping ring clamping surface 32.

Consequently, the construction and arrangement of the piston 52 and the fluid channel 34 which permits the slidability of the piston 52 between a first, normal, unpressurized or rest position when it is not under tension (as shown in FIGS. 3 and 5) and a second, extended, pressurized or tension position when it is slid to the right under the action of pressurized hydraulic fluid 50 to tension a clamped saw blade (as shown in FIG. 4) also aids in insertion and removal of the piston 52 when that is necessary.

As will be readily apparent to those skilled in the art, the invention may be used in other specific forms and for other purposes without departing from its spirit or essential characteristics. The present embodiment is, therefore, to be considered as illustrative and not restrictive, the scope of the invention being indicated by the claims rather than by the foregoing description, and all changes which come within the meaning and range of equivalents of the claims are therefore intended to be embraced therein.

What is claimed is:

1. In a blade mounting and tensioning apparatus, said apparatus including first and second confronting annular clamping members, means disposed proximate the circumference of each of said clamping members for fixedly clamping the periphery of a circular blade therebetween, an annular fluid channel within said first clamping member located radially inward of said blade clamping means and having an opening confronting one side of said blade, means for communicating pressurized fluid to said fluid channel, an annular recess channel within said second clamping member radially aligned with said annular fluid channel and having an opening confronting the other side of said blade, the opening of said recess channel being formed to receive an overlying portion of said blade when said overlying blade portion is deformed in response to pressure transmitted to said one side of said blade by said pressurized fluid to thereby tension said blade, the improvement comprising:

a unitary annular sealing piston formed of deformable resilient material arranged to be disposed in said fluid channel for axial sliding movement therein to deform said blade in response to said pressurized fluid within said fluid channel, said fluid channel having a pair of substantially smooth side walls for sliding engagement with said piston; said piston having a main body part with a blade contact surface on one side thereof confronting said one side of said blade, said contact surface being operative to maintain substantially uniform contacting relationship with respect to said one side of said blade when said piston slides in said fluid channel to deform said blade, the other side of said main body part having a pair of sealing arms extending therefrom, each of said sealing arms being urged radially outwardly in sealing relationship against each of said side walls, respectively, for sealing said pressurized fluid within said fluid channel; said main body part having a cross section with a ratio of thickness to radial extent thereof sufficient to maintain each of said sealing arms in said sealing relationship when said piston deforms said blade in response to said pressurized fluid confronting said other side of said main body portion.

2. The improved blade mounting and tensioning apparatus of claim 1, said main body part of said piston being of generally rectangular cross section and each of said sealing arms being of generally triangular cross section.

3. The improved blade mounting and tensioning apparatus of claim 1, wherein said pair of sealing arms are formed on the other side of said main body part of said piston with a predetermined outward radial taper when said piston is outside of said fluid channel so that said sealing arms are urged radially outwardly in said sealing relationship against said side walls, respectively, when said piston is disposed within said fluid channel.

4. The improved blade mounting and tensioning apparatus of claim 1, wherein said ratio of thickness to radial extent of said main body part of said piston is about one-third.

5. The improved blade mounting and tensioning apparatus of claim 4, wherein said piston is formed of polyurethane.

* * * * *